United States Patent [19]

Ossian et al.

[11] 4,190,477

[45] Feb. 26, 1980

[54] POUCH

[75] Inventors: William F. Ossian, Appleton; Thomas S. Wildenberg, Kimberly, both of Wis.; Henry Warmbier, New Hope, Minn.

[73] Assignee: American Can Company, Greenwich, Conn.

[21] Appl. No.: 901,644

[22] Filed: May 1, 1978

Related U.S. Application Data

[62] Division of Ser. No. 866,928, Jan. 4, 1978.

[51] Int. Cl.² ............................................. B29B 3/00
[52] U.S. Cl. .......................... 156/244.11; 156/244.12; 156/244.27; 428/35; 428/461; 428/516
[58] Field of Search ..................... 428/35, 461, 516; 156/244.11, 244.12, 243, 244.27

[56] References Cited

U.S. PATENT DOCUMENTS

| | | | |
|---|---|---|---|
| 3,922,473 | 11/1975 | Kosaka et al. | 427/409 |
| 4,049,904 | 9/1977 | Hori et al. | 429/461 |
| 4,085,244 | 4/1978 | Stillman | 428/461 |

*Primary Examiner*—George F. Lesmes
*Assistant Examiner*—E. Rollins Buffalow
*Attorney, Agent, or Firm*—Robert P. Auber; Ira S. Dorman; Douglas W. Wyatt

[57] ABSTRACT

A hermetically sealed pouch, being safe for the storage of foods, avoiding giving a taste to enclosed food, the filled pouch being able to withstand cooking temperatures typically used to cook food.

5 Claims, 3 Drawing Figures

POUCH

This is a division of application Ser. No. 866,928, filed Jan. 4, 1978.

BACKGROUND OF THE INVENTION

In the food processing industry the trend is to replace metal cans with something more convenient and more efficient. To that end, retort pouches have been conceived.

A typical retort pouch is made of face-to-face laminate structures which are sealed together on three sides before filling, and they are sealed on the fourth side after filling. The sealed retort pouches usually are heated or retorted after final sealing to cook the contents of the pouch and to kill all bacteria within the pouch.

To laminate structures, typically, comprise an aluminum foil with a polyester adhesively attached to one side thereof, frequently by means of a polyester urethane adhesive, and a sealable lamina attached to the second side of the foil.

If all that was desired was the structuring of a pouch, the sealable lamina of the aluminum foil could also be attached in the same manner as the polyester lamina. However, polyester urethanes have not been approved by governmental authorities because of possible contamination of the contained food. Therefore, for retort pouches for enclosing food, a maleic anhydride polymer grafted onto polypropylene is coated on the second surface of the aluminum foil, and then it is heat-cured in line with coating operation. Such materials are known by the trade names Hercoprime and Morprime. An inner sealant layer of polypropylene is then attached onto the maleic anhydride polymer grafted onto polypropylene at high temperatures on the order of 500° Fahrenheit. Unfortunately, the high temperature heating of the sealant layer of polypropylene appears to oxidize the surface of the polypropylene thereby increasing the difficulty of sealing the laminate structures together to form the pouch.

BRIEF DESCRIPTION OF THE INVENTION

To enhance the structural integrity of the laminate and pouches made therefrom, in accordance with this invention, a separate layer of polypropylene is extruded into a combining nip as an adhesive between a previously cast sealant layer of polypropylene and the cured layer of maleic anhydride polymer grafted on polypropylene. In this process an extrusion coating die is positioned as close as practical to the nip and extrudes a sheet of polypropylene between those two layers. One of the rolls forming the nip is chilled to cool the laminate.

It is therefore an object of this invention to provide a process for making laminate structures suitable for use in retort pouches.

It is a further object to this invention to provide such a laminate structure.

It is a further object to this invention to provide a novel retort pouch.

BRIEF DESCRIPTION OF THE DRAWINGS

Other objects will become apparent from the following description, taken together with the accompanying drawings, in which.

DETAILED DESCRIPTION OF THE INVENTION

Figure 1:
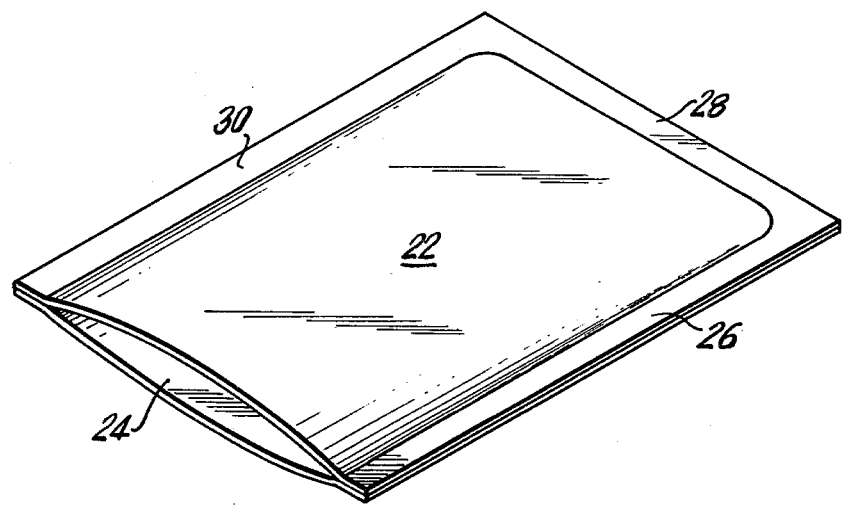
FIG. 1 shows a retort pouch sealed around three edges and ready for filling.

FIG. 1 shows a retort pouch having substantially similar front and back walls 22 and 24 sealed together on three edges 26, 28, and 30, and open on the fourth edge to receive food.

Food is placed in the pouch, the fourth edge sealed, and the entire pouch with the food therein is heated or retorted.

Figure 2:
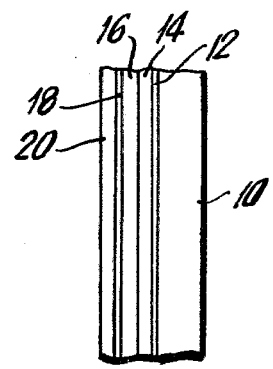
FIG. 2 is a diagram, with thicknesses exaggerated, of a laminate structure in accordance with this invention.

The novel laminate structure used for each of the side walls 22 and 24 is shown in FIG. 2. The inside or sealant lamina is the layer that contacts the food. The sealant layer 10 is attached by the layer 12 to the primer layer 14 on the aluminum or other metal foil stock 16. On the outside a biaxially oriented polyester layer 20 is attached by an adhesive 18 to the foil 16. The layer 20 physically protects the foil from being penetrated or otherwise physically damaged.

The sealing layer 10 contains polypropylene, and it may contain either polyethylene or ethylene vinyl acetate copolymer, or both. The polyethylene and/or ethylene vinyl acetate copolymer may be used either as a blend or as a copolymer/terpolymer with the polypropylene. Typically a terpolymer of propylene, ethylene, and vinyl acetate, film grade resin, with a melt flow index of about 10 and having a thickness between 1½ and 6 mils is used.

Figure 3:
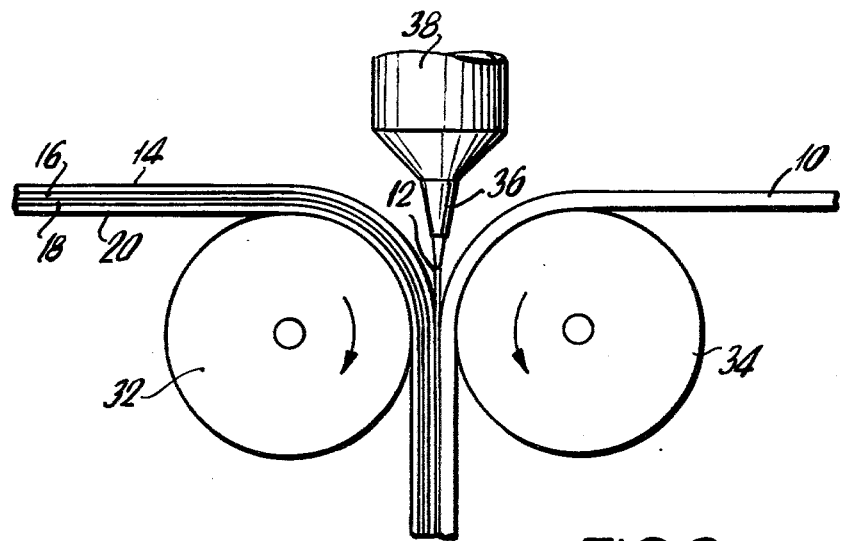
FIG. 3 shows the laminate of this invention being assembled.

The lamina 12 is an extrusion grade polypropylene or polypropylene copolymer or polypropylene polyethylene blend. One acceptable material is sold under the trade name of Eastman 4G7DP. The layer 12 is inserted into the laminate as shown in FIG. 3. A storage tank or hopper 38 contains the pelletized material which is extruded through the extrusion die into a sheet 12. The sheet 12 is drawn into the nip between the lamina 10 and the cured lamina 14 at a temperature on the order of between 540° and 640° Fahrenheit. Either roller 32 or 34 is a temperature controlled roller whose best temperatures are between 155° and 160° Fahrenheit, although as low as 50° Fahrenheit and as high as 250° Fahrenheit are acceptable. The other roller 32 or 34 may be used with or without direct temperature control.

The extruded resin sheet 12 may also contain ethylene vinyl acetate either as a copolymer or a blend. Typically the resin melt flow is between 25 and 90 with a typical value of 60.

The lamina 14 between the foil 16 and the layer 12 is formed from a suspension or dispersion of polymer in a liquid. The polymer is a graft copolymer of maleic anhydride onto a propylene backbone; a typical copolymer is sold under the trademark Hercoprime. Also about 3% of an ethylene vinyl acetate copolymer may be used. The liquid is a mixture of methyl cellosolve; toluene; deodorized kerosene; and Varnish Makers & Painters naphta sold under the trade mark of Naphtholite by Union Oil Co. is a petroleum naphtha having a narrow boiling range near 253° F. and is described on page 1,576 in the 1976 edition of McGraw Hill Dictionary of Scientific and Technical terms. The polymer suspension is sold under the trade name of Morprime. Although the exact nature of the lamina bonding is not clearly known it is believed the maleic anhydride bonds chemically to metal foil 16, and the polypropylene bonds to layer 12.

The aluminum foil layer 16 may be between ¼ mil and 5 mils in thickness. The outer lamina 20 is preferably 0.48 mil mylar, but its thickness range may be between ¼ mil and 2 mils in thickness. The lamina 20 may be any material which protects the foil layer 16 from physical damage. It is typically either biaxially oriented polyester such as mylar, or it is a polyamid such as nylon. The mylar or laminate 20 is attached to the outside of the foil 16 by an adhesive layer 18 which may be a two component polyester urethane adhesive. Examples of appropriate adhesive are sold under the trade names of Desoto EPS-71 and Morton Adcote 506. The layers 14, 16, 18, and 20 are assembled together and heat cured. As shown in FIG. 3, that heat cured laminate structure and the sealant lamina 10 are pulled by the nip formed by the rolls 32 and 34 into that nip. The extrusion die 36 feeds a sheet of laminar material 12 directly into the nip between laminae 10 and 14. The distance between the die 36 and the nip is adjustable to obtain optimum adhesion among laminae 10, 12 and 14. Before bonding the sheet 10 may be surface treated in an ionized electric field.

After the finished laminate structure is completed, it is cut to size and sealed on three edges 26, 28, and 30 as shown in FIG. 1. Because the material in face to face contact in layers 10 is not oxidized, the layers form adequate and uniform seals on production equipment.

Thus, the invention herein described is a new laminate structure together with the process for making such a structure, and the laminate structure is particularly useful in the making of retort pouches which contain a food or other such material.

Obviously the retort pouch could be used for the carrying of other items needing hermeticseals such as antiseptic bandages, other medical materials, and hard to hold chemically active products.

Although the invention has been described in detail above, it is not intended that the invention should be limited by that description, but only by the combined description set forth in the specification and the claims.

We claim:

1. A method of making a multiply laminated structure comprising an inside sealing layer containing polypropylene and an outer metal foil layer, which method comprises:
    (a) applying a primer layer to said metal foil, said primer layer being a graft copolymer of maleic anhydride and propylene wherein the maleic anhydride moieties are grafted onto a polypropylene backbone;
    (b) drawing said primed metal foil laminate and said sealing layer in face-to-face relation into the nip defined by a pair of rollers; and
    (c) simultaneously drawing a hot layer of extrusion grade polypropylene into said nip between said sealing layer and primer layer to thereby laminate said sealing layer to said primer layer.

2. The method of claim 1 wherein said extrusion grade polypropylene layer is at a temperature between about 540° F. and about 640° F.

3. The method of claim 1 wherein the temperature of one of said rollers is controlled.

4. The method of claim 2 wherein the temperature of one of said rollers is controlled.

5. The method of claim 2 wherein one of said rollers is chilled below the temperature of said layer of extrusion grade polypropylene.

* * * * *